US012482987B2

(12) United States Patent
vom Stein et al.

(10) Patent No.: US 12,482,987 B2
(45) Date of Patent: Nov. 25, 2025

(54) CONNECTION ELEMENT AND ELECTRONIC COMPONENT PART WITH MULTIPLE PLUG-IN POSITIONS FOR TWO-WIRE TECHNOLOGY

(71) Applicant: TURCK Holding GmbH, Halver (DE)

(72) Inventors: Johannes vom Stein, Hückeswagen (DE); Nikolaj Löwen, Wuppertal (DE)

(73) Assignee: TURCK Holding GmbH, Halver (DE)

( * ) Notice: Subject to any disclaimer, the term of this patent is extended or adjusted under 35 U.S.C. 154(b) by 446 days.

(21) Appl. No.: 18/154,973

(22) Filed: Jan. 16, 2023

(65) Prior Publication Data

US 2023/0231342 A1 Jul. 20, 2023

(30) Foreign Application Priority Data

Jan. 18, 2022 (DE) ........................ 102022101013.9

(51) Int. Cl.
*H01R 13/631* (2006.01)
*H01R 24/20* (2011.01)
*H01R 103/00* (2006.01)

(52) U.S. Cl.
CPC ......... *H01R 13/6315* (2013.01); *H01R 24/20* (2013.01); *H01R 2103/00* (2013.01)

(58) Field of Classification Search
CPC .... H01R 13/6315; H01R 24/20; H01R 24/86; H01R 2103/00

(Continued)

(56) References Cited

U.S. PATENT DOCUMENTS 4,746,298 A * 5/1988 Hollander .............. H01R 27/00 439/223
5,137,462 A 8/1992 Casey et al.
(Continued)

FOREIGN PATENT DOCUMENTS

DE 199 32 243 A1 1/2001
DE 10 2014 115 731 A1 5/2016
(Continued)

OTHER PUBLICATIONS

German Search Report in DE Appl. No. 10 2022 101 013.9 mailed Sep. 9, 2022, 7 pages.
(Continued)

*Primary Examiner* — Harshad C Patel
(74) *Attorney, Agent, or Firm* — Kowert, Hood, Munyon, Rankin & Goetzel, P.C.; Gentry C. McLean; Dean M. Munyon

(57) ABSTRACT

A connection element is disclosed. In an embodiment, the connection element includes a guide element and first and second contact elements arranged at a distance from one another. The guide element at least partially surrounds the contact elements and is configured to guide and receive at least one mating connection element. The first and second contact elements have respective first and second contact sections configured for connection to a mating contact element of the mating connection element. The first and second contact sections lie on a straight connecting line which runs orthogonally through the first and second contact element axes and the contact sections have different lengths along a direction of the straight connecting line. A kit of parts and an electronic component part, each including at least one connection element as described, are also disclosed.

20 Claims, 11 Drawing Sheets

(58) Field of Classification Search
USPC ................................ 439/246, 630, 638, 639
See application file for complete search history.

(56) References Cited

U.S. PATENT DOCUMENTS

| | | | | | |
|---|---|---|---|---|---|
| 5,409,390 | A * | 4/1995 | Yoshida | H01R 27/00 | 439/218 |
| 9,147,952 | B2 * | 9/2015 | Kikuchi | H01R 12/7082 | |
| 9,281,629 | B2 * | 3/2016 | Little | H01R 13/506 | |
| 9,281,643 | B1 * | 3/2016 | Tseng | H01R 13/518 | |
| 9,318,856 | B2 * | 4/2016 | MacDougall | H01R 24/60 | |
| 9,337,588 | B2 * | 5/2016 | Chang | H01R 13/6594 | |
| 9,356,406 | B2 * | 5/2016 | Yen | H01R 13/6585 | |
| 9,362,682 | B2 * | 6/2016 | Chien | H01R 13/502 | |
| 9,525,244 | B1 * | 12/2016 | Hsu | H01R 24/60 | |
| 9,543,718 | B2 * | 1/2017 | Dandl | H01R 13/6585 | |
| 9,847,614 | B1 * | 12/2017 | Wu | H01R 13/506 | |
| 11,025,000 | B2 * | 6/2021 | Wan | H01R 13/426 | |
| 11,303,071 | B2 * | 4/2022 | Xu | H01R 24/60 | |
| 2010/0267261 | A1 * | 10/2010 | Lin | H01R 13/6461 | 439/218 |
| 2013/0316581 | A1 * | 11/2013 | Kao | H01R 13/658 | 439/607.28 |
| 2015/0126054 | A1 * | 5/2015 | Hoyack | H01R 12/91 | 439/246 |
| 2017/0062977 | A1 | 3/2017 | Matsuura | | |
| 2021/0013657 | A1 | 1/2021 | Bacher | | |
| 2021/0408740 | A1 | 12/2021 | Blakborn | | |

FOREIGN PATENT DOCUMENTS

| | | | |
|---|---|---|---|
| DE | 10 2017 101 544 | A1 | 7/2018 |
| DE | 20 2019 000 733 | U1 | 3/2019 |
| DE | 10 2019 131 596 | B3 | 1/2021 |
| EP | 1983617 | A2 | 10/2008 |
| EP | 2359441 | B1 | 4/2014 |
| EP | 2297824 | B1 | 12/2016 |
| EP | 2571441 | B1 | 3/2020 |
| WO | 2009/152630 | A1 | 12/2009 |

OTHER PUBLICATIONS

Examination Report in European Appl. No. 22 214 146.7 mailed Mar. 4, 2025, 6 pages.

Extended European Search Report in Appl. No. 22214146.7 mailed Jun. 16, 2023, 8 pages.

* cited by examiner

CONNECTION ELEMENT AND ELECTRONIC COMPONENT PART WITH MULTIPLE PLUG-IN POSITIONS FOR TWO-WIRE TECHNOLOGY

CROSS-REFERENCE TO RELATED APPLICATIONS

The present application claims priority under 35 U.S.C. § 119 to German Patent Application No. DE 10 2022 101 013.9, filed Jan. 18, 2022, the disclosure of which is incorporated by reference herein in its entirety.

An appendix containing original drawings rendered partially in color is filed with this disclosure and incorporated by reference herein.

TECHNICAL FIELD

This disclosure relates to electrical or data-carrying connectors, and particularly to a connection element, a kit of parts and an electronic component part as described herein.

DESCRIPTION OF RELATED ART

By means of a detachable connection element, an electrical or optical connection between a data-transmission cable and a mating connection element, such as a connection socket, can be produced and released again. These are known with almost any number of pins, wherein, for example, an 8-pin connection element is known from EP 2 359 441 B1.

Within every communication and power supply technology, general norms and standards have developed, alongside the manufacturer's own provisions, which define dimensions and safety-related specifications. Some of these standards differ nationally or regionally, with the result that adapter systems are widespread. Such adapters are widespread, for example in the field of 220-2240V power cables and connectors, as known from WO 2009/152630 A1 or from EP 2 297 824 B1, which disclose complex travel adapters with which power connections to the most well-known plug contacts are possible. These are characterized by the fact that they either have a plurality of plug-in positions with two plug sockets each, which lead to a single fixed plug connector, or vice versa.

In the field of two-wire technology, such as for example PoDL (Power over Data Line), SPE (Single Pair Ethernet), TPE (Twisted Pair Ethernet), connection elements are likewise known and associated connection elements with different standards, in accordance with IEC 60603-7-5 for example, are available. Embodiments of connection elements which apply this standard are known for example from DE 10 2017 101 544 B3, which discloses a connection element with a catch element, which is retained on a fixed bearing and a floating bearing. A comparable connection element is known from DE 10 2019 131 596 B3, in which the connection element makes an advantageous, secure positive-locking connection to the mating connection element possible.

The increasing development of automation technology on the one hand leads, for the same transmission technology, such as for example SPE, to more standardized, but nevertheless differently constructed connection elements and furthermore progressive miniaturization leads to high demands with respect to the weight and the space requirement of the connection elements. In order to meet these demands, DE 20 2019 000 733 U1 for example proposes providing a type of adapter socket, which cooperates with a receivable replaceable or interchangeable element which can provide two different connector plugs in an installation position rotated by 180°.

A disadvantage of the previously known solutions is that the diversity of variants of the possible connection element is very complex for the manufacturers of electronic component parts and requires extensive stock. Furthermore, the users of such electronic component parts must often provide adapter elements, which require additional installation space and themselves represent a potential weak point for the transmission.

SUMMARY OF DISCLOSED EMBODIMENTS

The object of the disclosed embodiments is to provide an improved connection element, which avoids the above-named disadvantages in the state of the art as far as possible.

This object is achieved according to the disclosed embodiments by a connection element, a kit of parts and an electronic component as described herein. Advantageous designs are specified in the respective, associated claims.

Accordingly, the object is achieved by a connection element for a power- and/or data-carrying transmission technology, in particular SPE, TPE, PoDL or the like, comprising

- at least one guide element,
- two power- and/or data-carrying contact elements, spaced apart from one another at a distance, with a first and a second central contact element axis, wherein the at least one guide element at least partially surrounds the contact elements and furthermore is formed for guiding and receiving at least one (complementary) mating connection element, which comprises two power- and/or data-carrying mating contact elements, spaced apart from one another at a distance, and at least one mating guide element. Here, the contact elements in each case have a contact section, which lies on a straight connecting line which runs orthogonally through both contact element axes. In other words, the contact sections on which a power- and/or data-carrying connection between contact plugs and contact pins can be effected extend transversely with respect to the movement axis for joining the contact elements. These contact element sections (E, F) have a length of at least 1.1 mm+/−0.15 mm and do not exceed the section length of 1.5 mm+/−0.15 mm.

Ideally, the contact sections of the contact elements have different lengths. As stated again in detail below, mating connectors which conform to the specifications of a different standard can thus be connected so as to carry data and power.

In an improved embodiment variant, the contact section is substantially formed by one of the two alternatives, by

- a slot width of the respective contact elements formed as a contact socket or
- the travel length of the contact pin of a pair of contact elements formed as contact pins, at least one of which is mounted displaceable linearly and parallel to the contact section, ideally both are mounted linearly displaceable. Thus, in the following, the length of a contact section generally has the same meaning as (is synonymous with) the width of a contact socket or the travel length of at least one contact pin.

In a first embodiment variant, the contact socket can be formed as a flat clasp, bracket or flat one- or two-sided spring element, which is retained resiliently on at least one side and/or has a resilient portion. The contact section on which a mating element can be brought to bear in a contacting manner and retained then corresponds to the width of such a contact socket, as named above. Alternatively, the contact section can be formed by a funnel-like socket opening or lead-in, by means of which the contact pins of a mating connection element are positively guided. In an alternative embodiment, the contact socket is formed as a round or oval sleeve, which is pivotably mounted. Furthermore, the sleeve can be formed of at least two segments and/or have at least one opening slot in the axial direction, in order to allow a certain elastic deformation in the radial direction with respect to the longitudinal axis.

Here, in an embodiment, the slot widths of the respective contact sockets or the travel lengths of the contact pins can in each case have different sizes.

As stated, the contact sections of the contact elements have different lengths, wherein the wider of the two contact sections has a length of 1.35-1.65 mm and the shorter contact section has a length of 0.95-1.25 mm. As stated again in detail below, mating connectors which conform to the specifications of different standards can thus be connected.

In a further improved variant of the connection element, the guide element has a transverse width which is defined by a first standard, for example DIN EN IEC 63171-6. This transverse width consists in particular of an inner or opening width, primarily the narrower, inner transverse width or opening width of two possible inner opening widths, of a mating guide element of a first mating connection element. Advantageously, this first transverse width is 2.3 to 2.6 mm+/−0.05 mm.

Furthermore, the connection element has a longitudinal width, transverse to the above-named transverse width, which is defined by a second standard, for example by DIN EN IEC 63171-5. This longitudinal width consists in particular of a further, in particular the larger inner longitudinal width or opening width of a mating guide element of a second mating connection element. Advantageously, this longitudinal width is 4.7 to 4.9 mm+/−0.05 mm.

In other words, in each case only one standard defines the delimiting dimensions in only one direction for at least one central element for the guiding or contact of a mating connector standardized as a whole.

In a further improved variant, at least one first alignment element is arranged on the outside of or outside the guide element, with the result that the contact arrangement of a mating connection element is always clearly defined and incorrect connections are prevented.

In a first group of embodiment examples, the connection element is a connection socket which is in particular characterized or defined by the fact that it has two contact elements formed as contact sockets.

In an improved variant of the first group of embodiment examples, a first alignment element and/or a second alignment element is provided, wherein

- the first alignment element with the guide element, along a partial section parallel to a longitudinal side, forms a guide path for a frame portion of a first mating connection element formed as a mating plug and
- the second alignment element has an inner contact surface, which acts as supporting and guiding surface for a second mating plug, in particular for the outer side of a guide element of a mating plug.

In the present case, by "inside", "inner side" or "inner surface" is meant the side, surface or direction which lies closer to the center of the connection element and/or lies opposite the center. An analogous, but inverted, interpretation is meant by "outside", "outer side" or "outer surface", unless expressly stated otherwise.

If the mating plug thus has guide elements in the form of a completely or partially circumferential frame, the latter is guided and supported between the first, inner alignment element and the guide element of the connection socket in a guide path formed in this way. Additionally or alternatively, the guide element of a mating plug can be placed on, supported on and/or have its position determined by the inner side of the second, outer alignment element.

The contact sockets are advantageously designed as wide slots, as described above, and have different dimensions with respect to their respective opening width and contact section. In an advantageous design, the guide element of a connection socket is flared towards the contact sockets in a funnel-shaped manner at least in the direction of the contact section, with the result that a mating plug can be inserted easily. Furthermore, the guide element is formed between two contact sockets as a separating or central web and ideally consists of an electrically insulating material or is coated with one. The separating or central web is advantageously arranged eccentrically, in order to conform to two or more standards of a mating plug.

The connection socket advantageously has a catch mechanism or locking mechanism. This mechanism has a resilient element, which is pushed out of its resting position when a mating plug is plugged in and, in the plugged-in position, springs back into a clearance and thus catches or locks the connection elements. Advantageously, the device lies on the straight connecting line.

In a second group of embodiment examples, the connection element is a connection plug, which is in particular characterized or defined by the fact that it has two contact elements formed as contact pins.

In an advantageous embodiment of the connection plug, the guide element is formed not completely circumferential, but rather

- is formed of at least guide element portions or
- has at least one opening portion.

A mating socket can thus protrude transversely over a theoretical footprint of the guide element of the connection plug with the outer contour of its guide element and only be brought into contact with, supported on and/or guided on the guide element portions in portions.

In an advantageous embodiment, the guide element has a drilled hole or opening, into which a resilient element (detent lug) of the mating socket can be inserted in the plugged-in state and can be retained in a contacting manner. This thus represents a catch mechanism or a locking mechanism. Advantageously, the drilled hole or the opening lies on the straight connecting line. In an improved variant, the opening can lie on a resilient element, with the result that it is arranged on the suitable, complementary position for a mating socket. It is advantageous here if the resilient element is mounted or spatially arranged in such a way that it

- can be easily displaced elastically when an embodiment with a wide insulation insert is plugged in and
- behaves rigidly in the case of an embodiment with catch mechanism or locking mechanism when tensile forces are introduced.

In a further embodiment, the guide element has an unmated portion, which is designed as or comprises a detent lug. The dimensions of this detent lug are such that the inner side is further away from the connecting axis than the socket element of a possible mating plug, in particular 1.45 mm+/−0.1 mm, and, at the same time, at the outer side having the detent lug, maintains the dimension for catching in another possible mating socket (2.7 mm+/−0.1 mm).

In the present case, a connection element is described partly by the mating connection element and in particular the standard of the mating connection element. This serves only for illustration and clarity, it is not intended to make the mating connection element the subject-matter of the invention, unless expressly described otherwise.

The different embodiments of connection elements and/or mating connection elements, which are defined by different standards, ideally belong to the same main standard, with the result that they thus also belong to the same technology or technology field, such as for example SPE.

In particular, an improvement consists of arranging at least one catch and/or closure element, which cooperates with a complementary mating catch and/or closure element of the respective mating connection element, on the connection element. The catch and/or closure element can in particular be arranged on the guide element and/or on a frame or frame portion.

The disclosed embodiments furthermore comprise an electronic component part for data- and power-carrying two-wire technology, such as in particular SPE, TPE etc., which has a casing and at least one internal electronic component. This internal component is in particular at least one circuit board (printed circuit board) with, for example, at least one electronic component, such as a microprocessor and/or a memory element, arranged hereon. Here, the electronic component part has at least one connection element according to one of the preceding embodiments and variants.

Ideally, the casing is formed in such a way, or has a corresponding connection element for mating plugs, in which the insulation insert forms an integral part of the casing and/or the connection element.

The disclosed embodiments furthermore comprise a kit of parts which is substantially formed of or comprises a connection socket and a connection plug for the data- and power-carrying connection of electronic component parts, wherein the kit of parts is formed according to one of the following alternatives:

- the connection socket is formed according to one of the disclosed embodiments and the mating connection element is formed as a mating connection plug in accordance with EN IEC 63171-5 or EN IEC 63171-6,
- the connection plug is formed according to one of the disclosed embodiments and the mating connection element is formed as a mating connection socket in accordance with DIN EN IEC 63171-5 or DIN EN IEC 63171-6 or
- the connection socket and the connection plug are formed in each case according to one of the disclosed embodiments.

Furthermore, the disclosed embodiments comprise an electronic component part for data- and power-carrying two-wire technology, such as in particular SPE, TPE, PoDL etc., which comprises an at least two-sided component part casing and/or a wall element. Connected to this or surrounded by it, at least one electronic component is provided, which in particular can be at least one circuit board (printed circuit board) with at least one electronic component arranged hereon. The electronic component part comprises at least one connection element, which is formed as a connection socket according to one of the preceding embodiments and/or as a connection plug according to one of the preceding embodiments.

An improvement here consists of the casing of the connection element representing an integral part of at least one portion of the component part casing.

BRIEF DESCRIPTION OF THE DRAWINGS

Further details and advantages of the disclosed embodiments are now to be explained in more detail with reference to several embodiment examples represented in the following drawings.

There are shown in.

DETAILED DESCRIPTION

Figure 1:
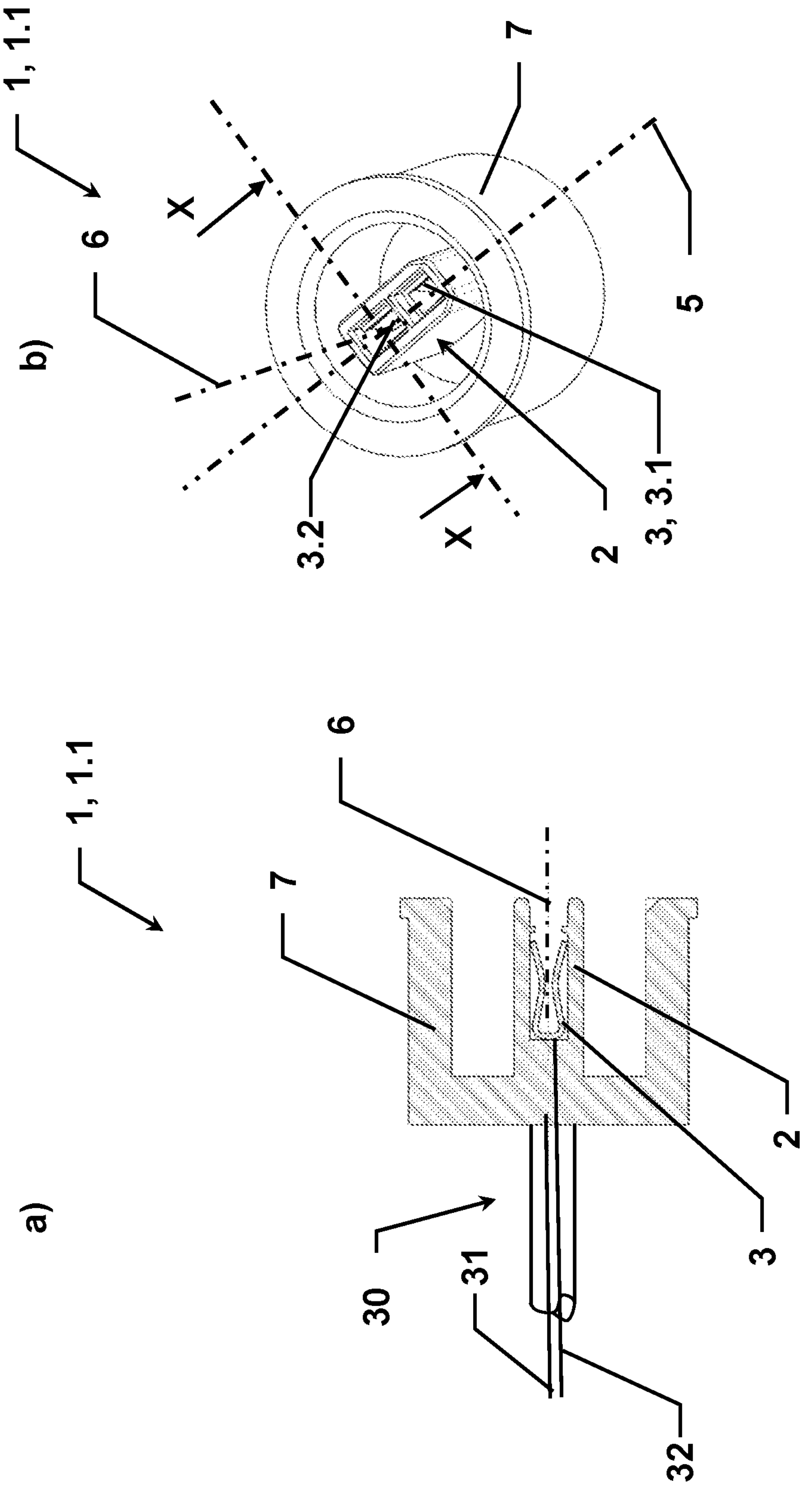
FIG. 1(*a*) a sectional representation of a connection element formed as a connection socket, FIG. 1(*b*) a schematic, perspective view and section position of FIG. 1 of the connection element, FIG. 2 a top view of a first embodiment of the connection socket according to FIG. 1, FIG. 3 a sectional representation of a further embodiment of a connection socket, FIG. 4 a top view of the embodiment according to FIG. 3 in three partial views I., II. and III., FIG. 5 a sectional representation of a third embodiment of a connection socket, FIG. 6 a top view of an embodiment according to FIG. 5 in three partial views I., II. and III. with a first mating plug connector, FIG. 7 a top view of an embodiment according to FIG. 5 in three partial views I., II. and III. with a second mating plug connector, FIG. 8 a top view of two further embodiments in two partial views I. and II. as variations of an embodiment according to FIG. 7, FIG. 9 a top view of a connection element formed as a connection plug in three partial views I., II. and III., FIG. 10 a sectional representation of a connection plug according to FIG. 9 and FIG. 11 an alternative embodiment to FIG. 10 of the displaceable mounting of the contact pins.

A connection element 1, which is cut along the section line X-X shown in FIG. 1 *b*), is represented as a connection socket 1.1 in FIG. 1 *a*). The connection socket 1.1 has a central guide body 2, in which a contact element 3 formed as a contact socket is received. The contact element 3 extends in the direction of the contact element axis 6, which is represented as a dot-dashed line and along which a mating connection element is inserted for the power- and/or data-carrying connection. From the rear side of the connection socket 1.1, supply line 30 with two wires 31, 32 is guided into the interior of the casing 7, wherein the wire 32 is conductively connected to the as contact element 3 in a manner not represented in more detail. The space between the guide element 2 and the casing 7 serves, as partially represented in the following figures, for receiving a mating connection element that is not shown. The same connection socket is represented in the perspective representation of FIG. 1 *b*).

The casing of the connection element and/or the mating casing made of plastic, metal or a combination hereof is collectively known from the standards mentioned multiple times, as are the solutions for the reciprocal positive- and/or non-positive-locking connection of a casing to a mating casing. These solutions are applied present analogously and are therefore not explained in more detail.

Figure 2:
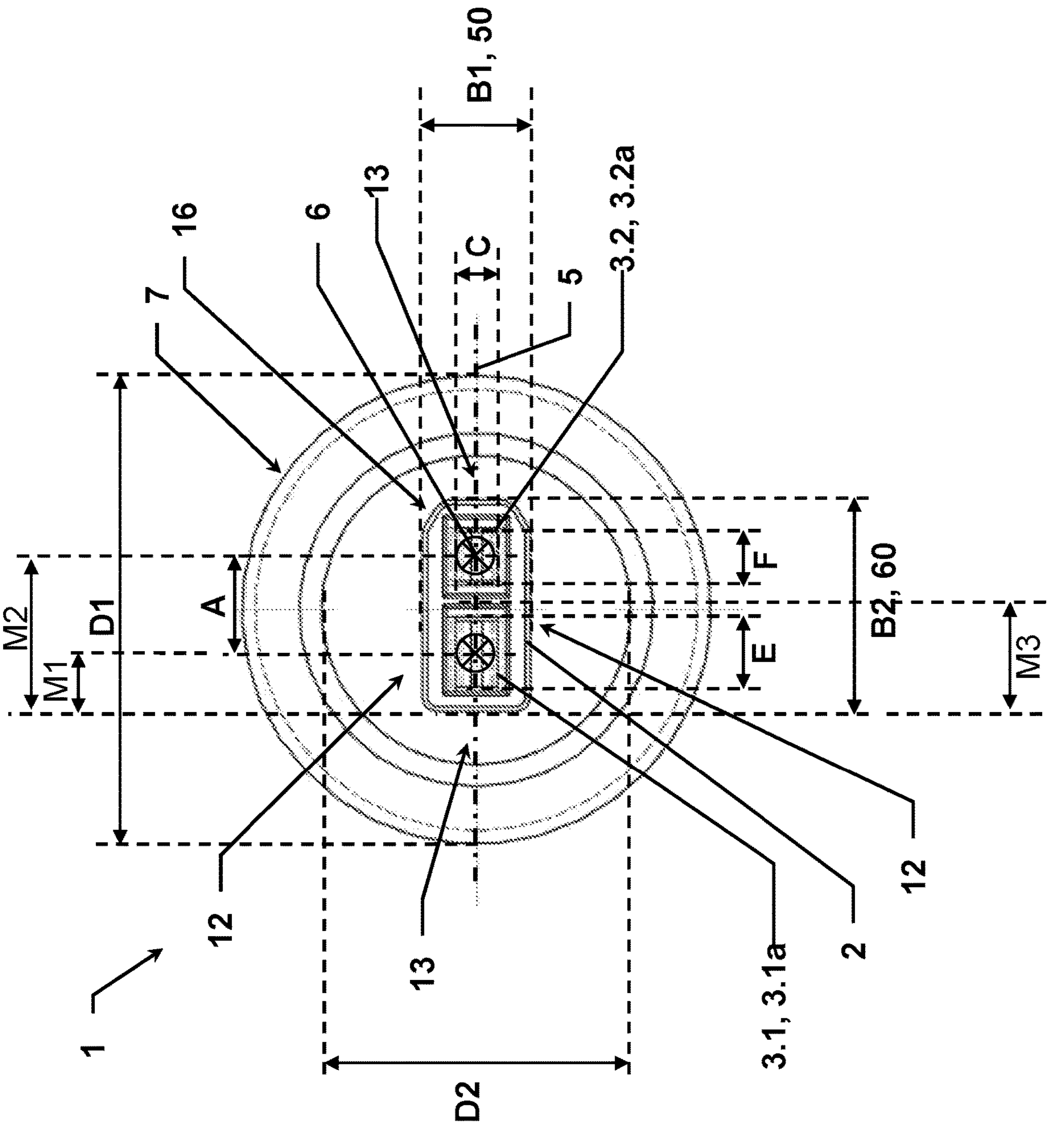

The top view of FIG. 2 shows the same connection element 1 of FIG. 1 formed as a connection socket 1.1. The casing 7 has an external diameter D1 and an internal diameter D2 in or on which the mating casing of a mating connection element can be brought into contact in a positive- and/or non-positive-locking manner, in a manner not described in more detail. Connection means, union nuts etc. possibly necessary for this are not represented. The two contact element axes 6 arranged centrally in the respective contact socket 3.1*a*, 3.2*a* are represented as a circle with a cross and point perpendicularly out of the display surface. They are at a distance A of 2.2 mm from one another, have an inner width E of 1.5 mm and a further inner width F of 1.1 mm, which in the present case corresponds to the length of the respective contact sections 4, on which a contact pin can be brought into conductive contact. These contact sockets are wider by a factor of 1.7-2.4 than the width of standard contact pins (0.64 mm) and wider by a factor of 1.1-1.6 than the standard contact socket (0.95 mm). The opening width C of the contact socket 3.1*a*, 3.2*b* corresponds to the width of DIN EN IEC 63171-5 and is 0.95 mm.

On the left-hand side, the guide element 2 has spotfaces or chamfers, which function as alignment element 10 in the case of a corresponding mating plug.

The important thing about this connection socket 1.1 is that the (small) transverse width B1 of the guide element 2, represented vertically, corresponds to standard DIN EN IEC 63171-6 and corresponds to 2.5 mm. The (large) longitudinal width B2, represented horizontally, corresponds to standard DIN EN IEC 63171-5 and has a length corresponding to this standard of 4.8 mm. As represented in even more detail in the following figures, a connection plug according to DIN EN IEC 63171-6 substantially comes into (positive-locking) contact only with the longitudinal sides 12 of the guide element 2, wherein a connection plug according to DIN EN IEC 63171-5 substantially comes into (positive-locking) contact only with the transverse side 13 and the alignment portions 16.

Here, in the embodiment example shown, the distance M1 of the left-hand contact element axis 6 from the (outer side) transverse side, represented on the left, is 1.3 mm+/−0.05 mm, the distance M2 of the right-hand contact element axis 6 is 3.5 mm+/−0.05 mm and the distance M3 of the central web 17 is 2.3 mm+/−0.05 mm.

Figure 3:
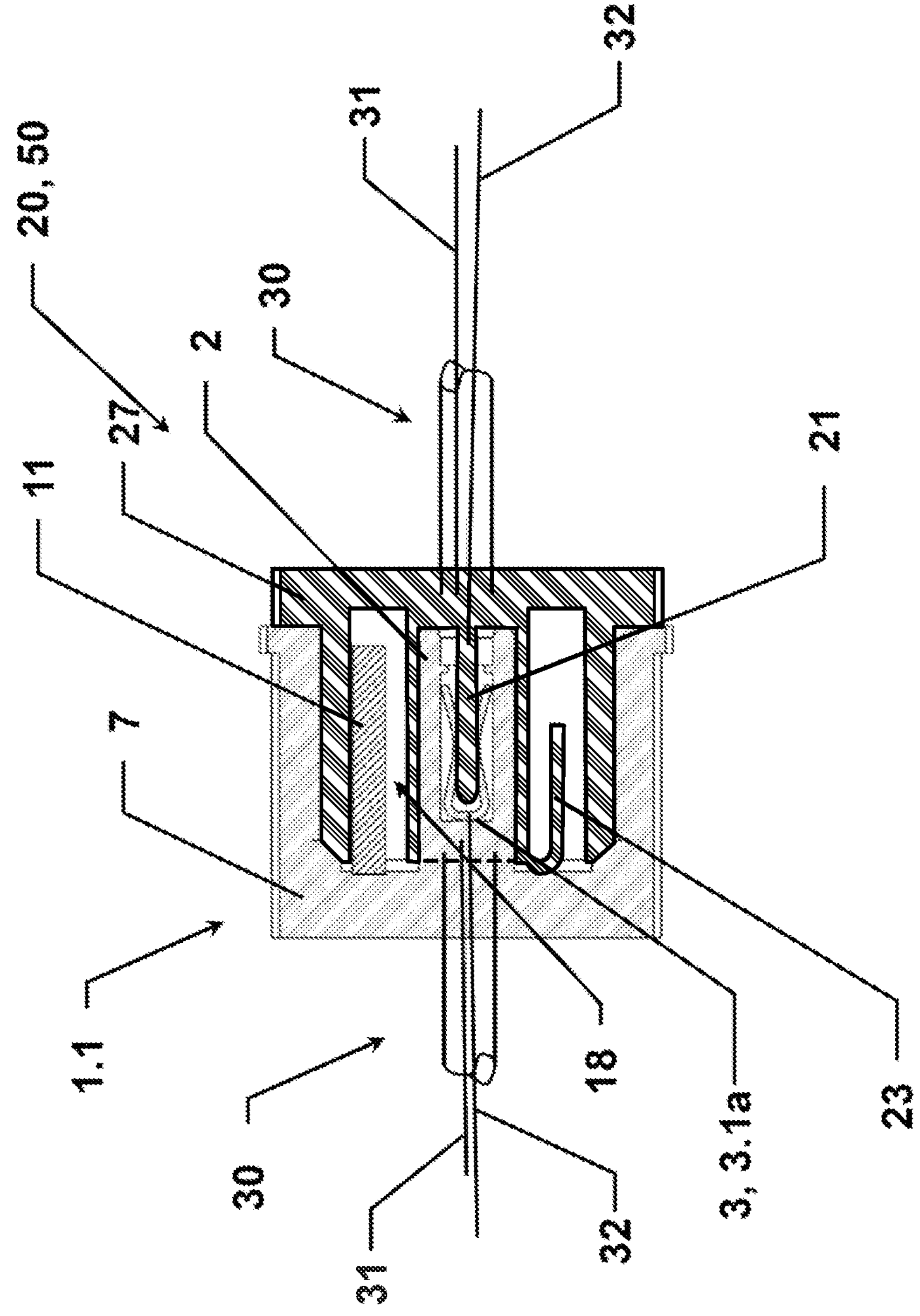

In the sectional representation according to FIG. 3, a mating connection element 20 formed as a mating connection element 50 according to DIN EN IEC 63171-6 with the associated mating casing 27 is inserted into a connection socket 1.1 so as to carry power and data, in that the contact socket 3.1*a* has received and locked the mating contact pin of the mating contact element 21 formed as a mating plug 50 in a clamping manner. Here, the section corresponds to that in FIG. 1 *b*) along the section line X-X shown. The connection socket 1.1 of FIG. 3 differs from the embodiment of FIG. 1 in that an (outer) alignment element 11 is provided, which, in cooperation with the mating alignment element 23 of the mating plug connector 20, 50, ensures a unique connection of the two plug elements.

Figure 4:
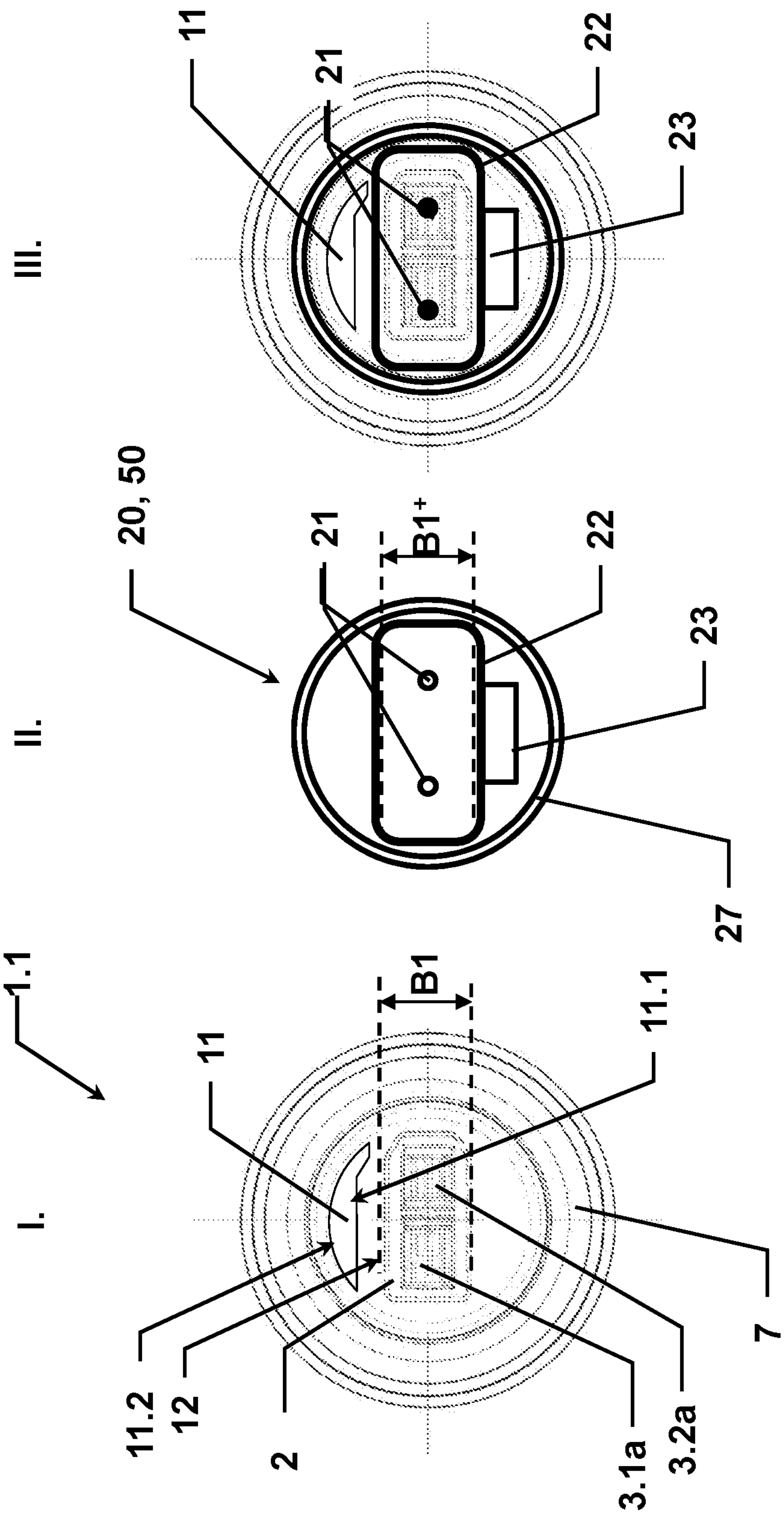

As shown in more detail in the associated FIG. 4, in partial view I. the alignment element 11 can be seen, which, on the inner side 11.1, has a portion parallel to the longitudinal side 12 of the guide element 2 and a second portion [parallel] to the first alignment portion 16 of the guide body 2. The outer side 11.2 of the alignment element 11 is formed parallel to the inner wall of the casing 7, with the result that, as represented in partial views II. and III., the mating casing 27 of a mating connection element 20 can be inserted there.

Partial view II. shows a mating connection element 50 (mating plug connector) formed according to DIN EN IEC 63171-6. This has, on a longitudinal side on the mating guide element 22 formed as a frame, a mating alignment element 23. Irrespective of the specific embodiment example it is true that the transverse width B1$^+$of the mating plug connector 50 correlates with the transverse width B1 of the guide element 2 of the connection socket 1.1, wherein the "+" means that the transverse width B1$^+$is 0.05 to 0.5 mm bigger than the transverse width B1. In other words, the transverse width B1$^+$is the standard width or the standard width range in accordance with DIN EN IEC 63171-6, with the result that the transverse width B1 according to the disclosed embodiments is 0.05 to 0.5 mm smaller than the standard transverse width in accordance with DIN EN IEC 63171-6. Partial view III. shows the connection of the connection socket 1.1 according to the disclosed embodiments to the standard mating plug connector. As represented in partial view III., the standard mating plug connector according to DIN EN IEC 63171-6 is in contact with both longitudinal sides 12 of the guide element 2, wherein the alignment element 11, in cooperation with the mating alignment element 23, allows only a single attachment position. The standard mating plug connector 50 is not guided on the transverse sides 13.

Figure 5:
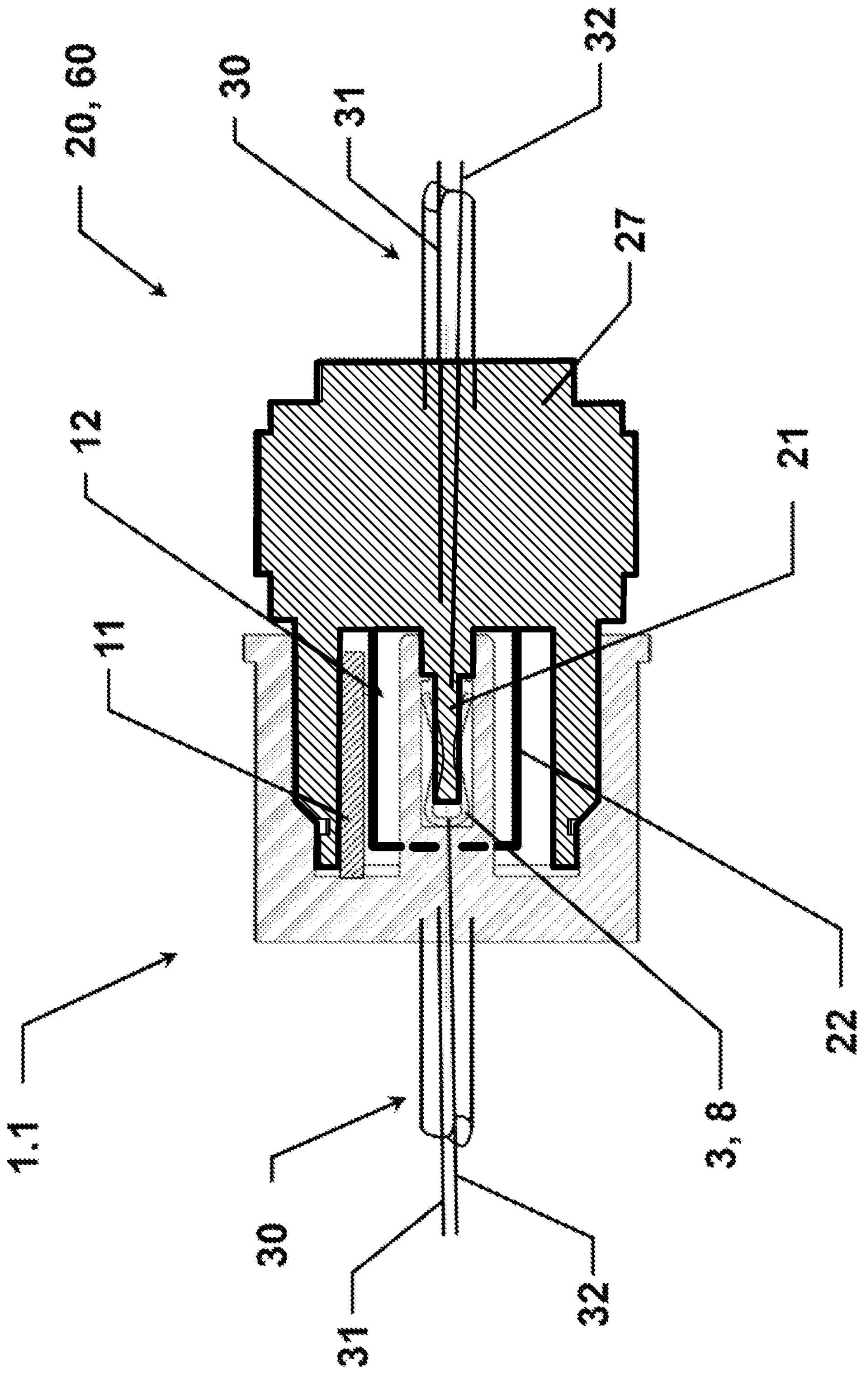
Figure 6:
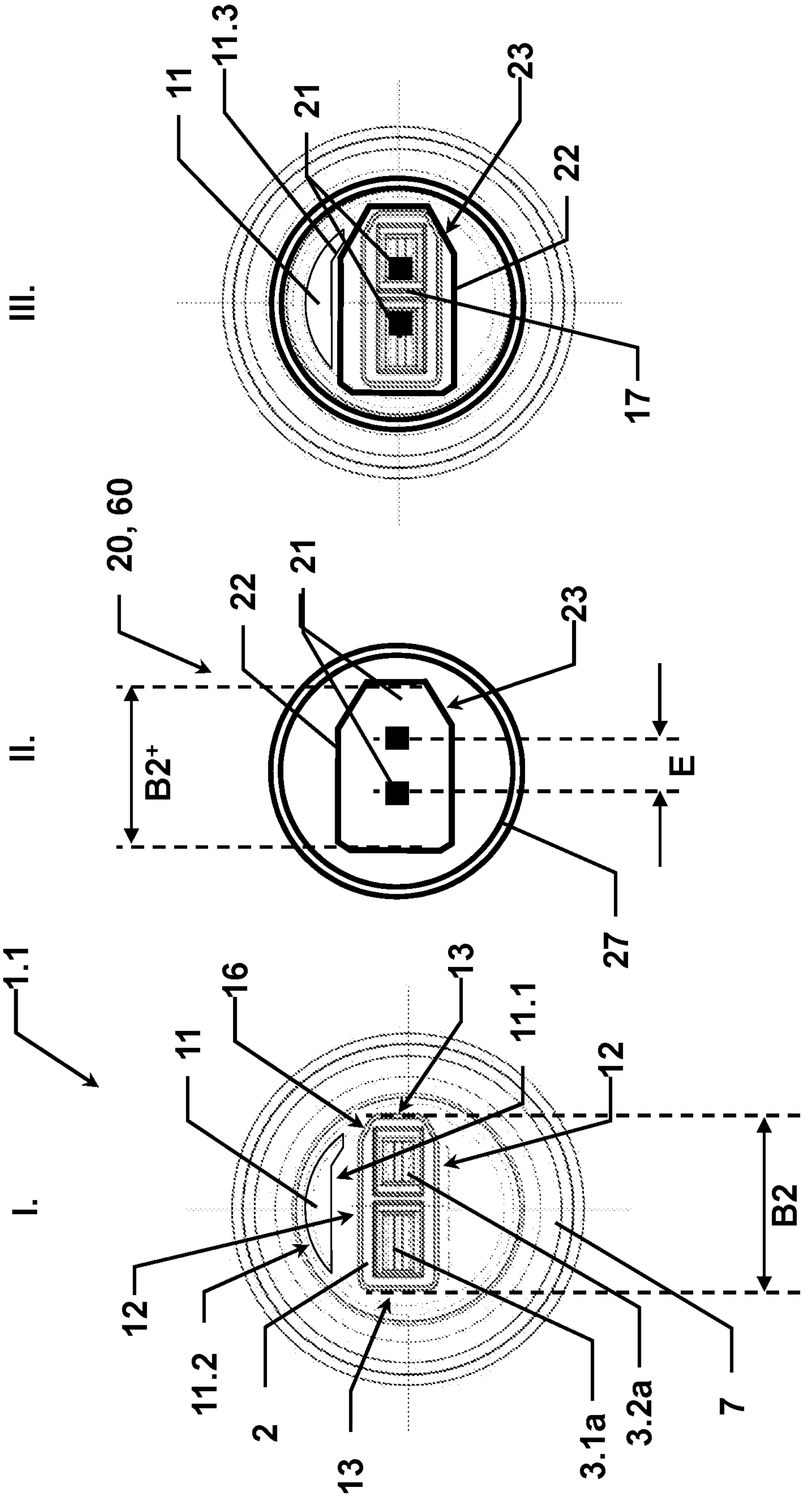

FIG. 5 shows the same embodiment of the connection socket 1.1 as FIGS. 3, 4 as a sectional representation, but in connection with a standard mating plug connector 60 according to standard DIN EN IEC 63171-5. Here, the section corresponds to that in FIG. 1 *b*) along the section line X-X shown. As can also be seen clearly in partial views II. and III. of FIG. 6, the mating guide element 22 is not in contact with the longitudinal sides 12 of the guide element 2. The mating guide element 22 is in contact only with the inner side 11.1 of the alignment element 11 with an outer partial surface, wherein the exact assignment can be seen in detail in the partial views of FIG. 6. Analogously to FIG. 4, partial view I. shows the connection socket 1.1 according to the disclosed embodiments with the one alignment element 11 and the alignment portion 16 on the transverse side 13 of the guide element 2, represented on the left. Partial view III. of FIG. 6 shows the situation in which the connection socket 1.1 and the mating plug connector 60 are plugged into one another. The mating contact elements 21 of the standard mating plug connector 60 are at a distance E of 1.8 mm+/−0.02 mm from one another. The mating contact element 21 represented on the left and formed as a pin is received in the left-hand, wider contact socket 3.1*a* adjacent to the central web 17, whereas the mating contact element 21 represented on the right and formed as a pin is arranged in the right-hand, narrower contact socket 3.2*a*, likewise adjacent to the central wall 17.

The mating plug connector 60 is in contact with the transverse sides 13 of the guide element 2 with the inner surfaces of its transverse sides and is at a distance from the longitudinal sides 12 of the guide element 2.

The position alignment between connection socket 1.1 and the mating plug connector 60 is effected via

- the alignment portion 16 of the guide element 2, opposite which and/or in contact with which an inner surface of the mating alignment portion 23 of the mating plug 60 lies and
- the alignment portion 11.3, represented on the right on the outer alignment element 11, opposite which and/or in contact with which a partial surface of the outer surface of the mating alignment portion 23 of the mating plug connector 60 lies. Here, the position alignment and outer guiding via the alignment portion 11.3 of an outer alignment element 11 is optional.

Irrespective of an embodiment variant and analogously to the statements in relation to FIG. 4, the longitudinal width $B2^{+}$of the mating plug connector 60 correlates with the longitudinal width B2 of the guide element 2 of the connection socket 1.1, wherein the "+" means that the longitudinal width $B2^{+}$is 0.02 to 0.5 mm bigger than the longitudinal width B1. In other words, the longitudinal width $B2^{+}$is the standard width or the standard width range in accordance with DIN EN IEC 63171-5, with the result that the transverse width B2 according to the disclosed embodiments is 0.02 to 0.5 mm smaller than the standard longitudinal width in accordance with DIN EN IEC 63171-5.

Figure 7:
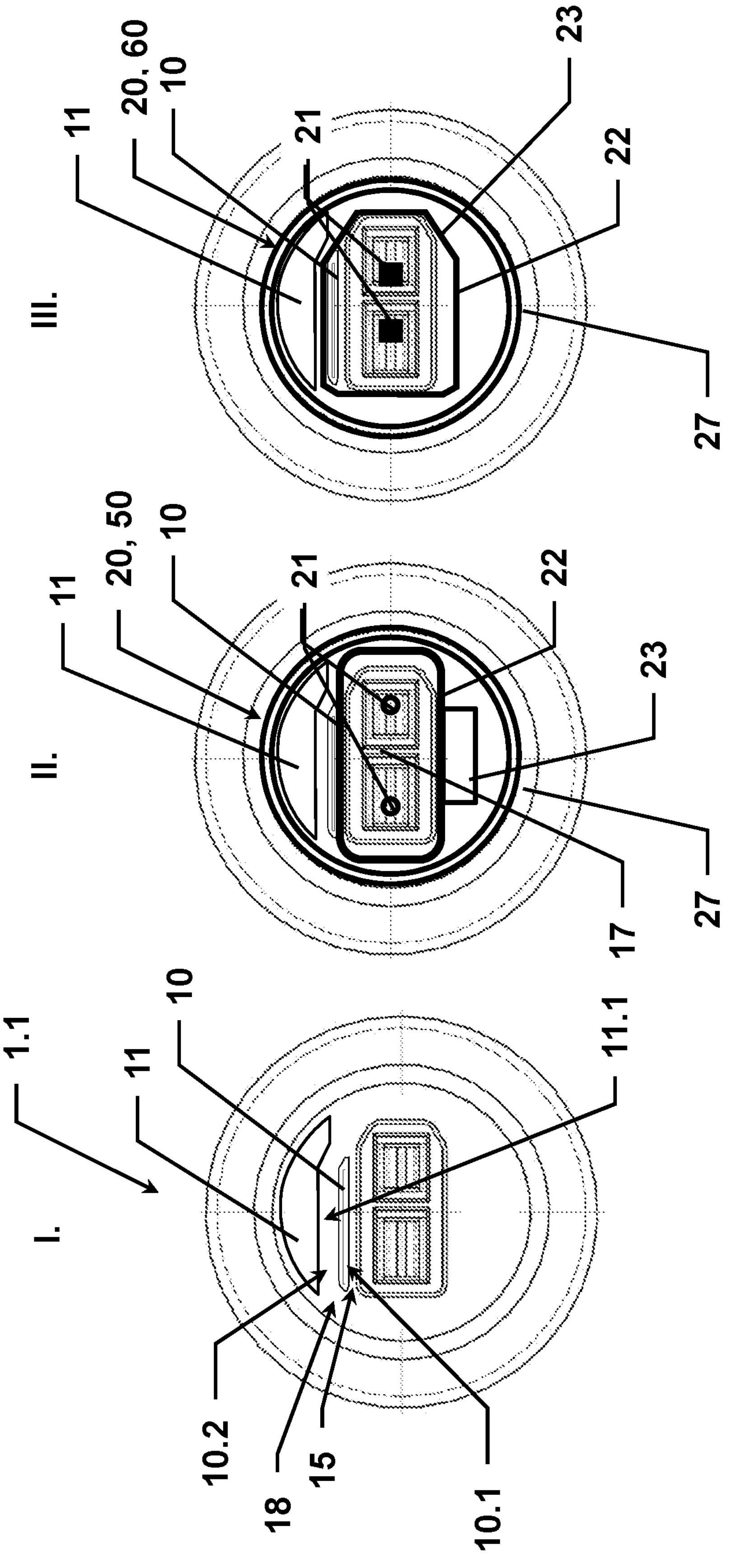

The embodiment according to FIG. 5 is also represented in a top view in three partial views I., II. and III. in FIG. 7, wherein the difference consists of a further resilient alignment element 10 formed as a web or wall. Parallel to and along the above-represented longitudinal side 12 of the guide element 2, an inner guide path 15 thus forms between the longitudinal side 12 of the inner contact surface 10.1 of the alignment element 10 and an outer guide path 18 forms between the outer contact surface 10.2 of the (inner) alignment element 10.

The connection of the connection socket 1.1 to a mating plug connector 20, 50 according to standard DIN EN IEC 63171-6 is shown in partial view II. of FIG. 7, wherein the mating guide element 22 thereof, formed as a frame, with the corresponding portion is also retained and guided in the guide path 15 by the alignment element 10, wherein the alignment element 10 is pushed outwards out of its resting position at least in portions. The mating alignment element 23 is arranged on the averted side. The two alignment elements 10 and 11 prevent a twisted arrangement of the mating plug connector 50. It can also be clearly seen that the two mating contact elements 21 are received and retained in the contact sockets 3.1*a*, 3.2*a* at the left-hand and right-hand outer ends, thus far away from the central web 17, in contrast to the mating contact elements of the other mating plug connector 50.

The connection of the connection socket 1.1 to a mating plug connector 60 according to standard DIN EN IEC 63171-5 is shown in partial view III. of FIG. 7, wherein the mating guide element 22 thereof, formed as a frame, with the corresponding portion is also retained and guided by the alignment element 10, but in the outer guide path 18.

In the example shown, the alignment element 10 is pushed inwards out of the resting position at least in portions, in particular resiliently in portions. The alignment is effected, as already described in relation to partial view III. of FIG. 4, via the alignment portion 16 and the mating alignment portion 23. In this variant, there is thus the possibility of plugging in a mating plug connector 50 in the case of which the surrounding area is filled in.

In an alternative embodiment to FIG. 7, which is not represented, only the web-like (inner) alignment element 10 is provided and the outer alignment element 11 is omitted, wherein in this case the space or the shadow area of the omitted outer alignment element 11 can be at least partially filled by a mating plug connector 50.

Figure 8:
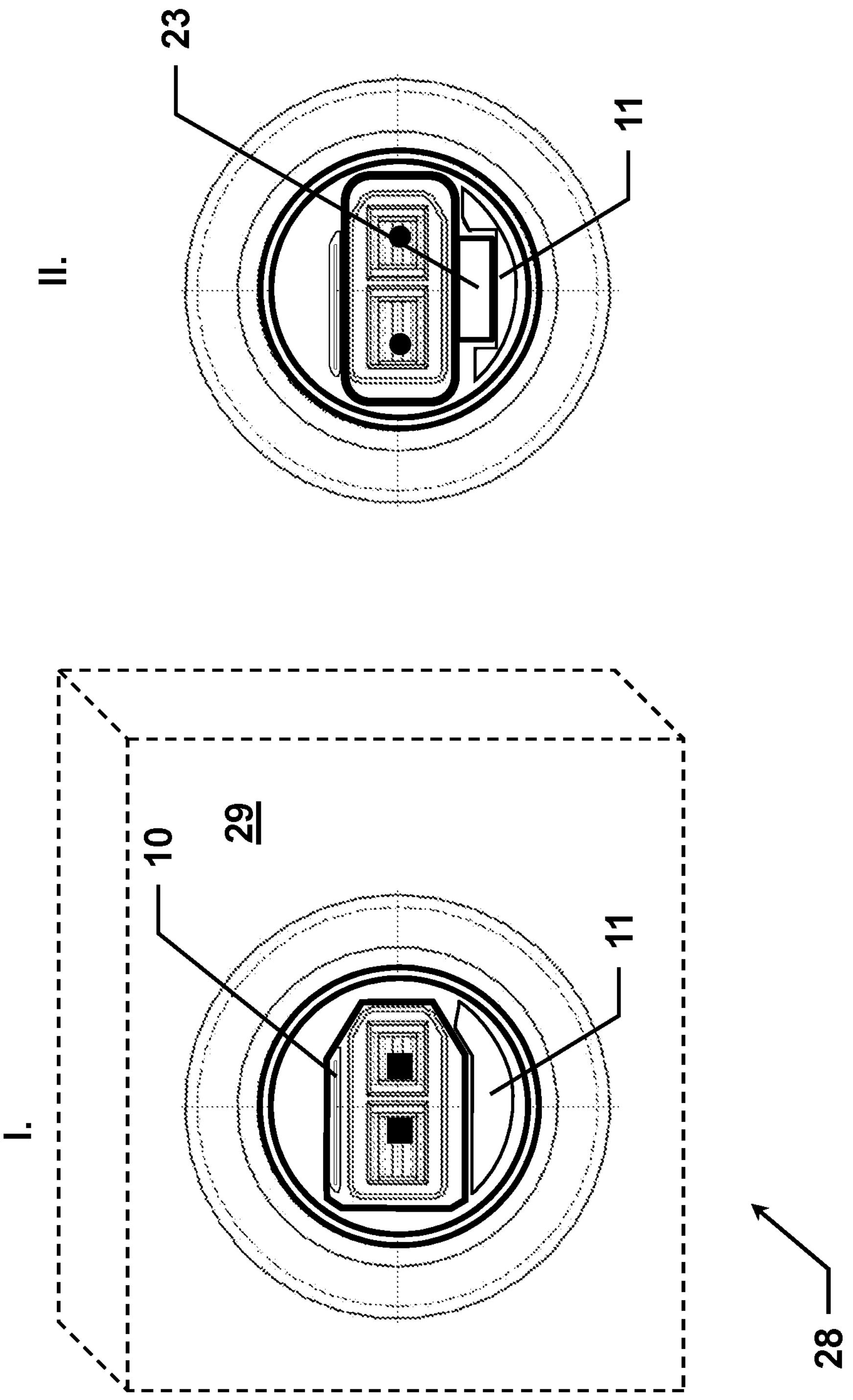

Further embodiment examples of a connection socket 1.1 are represented in the two partial views of FIG. 8, wherein the inner alignment element 10 and the outer alignment element 11 are arranged on the longitudinal sides 12 opposite the guide element 2. An electronic component part 28 with a casing 29 on all sides is indicated schematically as a dashed box in partial view I. of FIG. 8, wherein inner structural and electronic components are not represented. The mating plug connector 60 is formed according to standard DIN EN IEC 63171-5, analogously e.g. to partial view III. of FIG. 7.

The outer alignment 11 in partial view II. of FIG. 8 has a recess or groove, in which the mating alignment element 23 can be guided in the case of the target position of the mating plug connector 50, which is formed according to standard DIN EN IEC 63171-6, e.g. analogously to partial view II. of FIG. 7. In this case, the mating alignment element 23 corresponding to standard DIN EN IEC 61171-6 can include a catch mechanism or locking mechanism and the outer alignment element 11 can be designed as a complementary retaining element for the catch mechanism.

Figure 9:
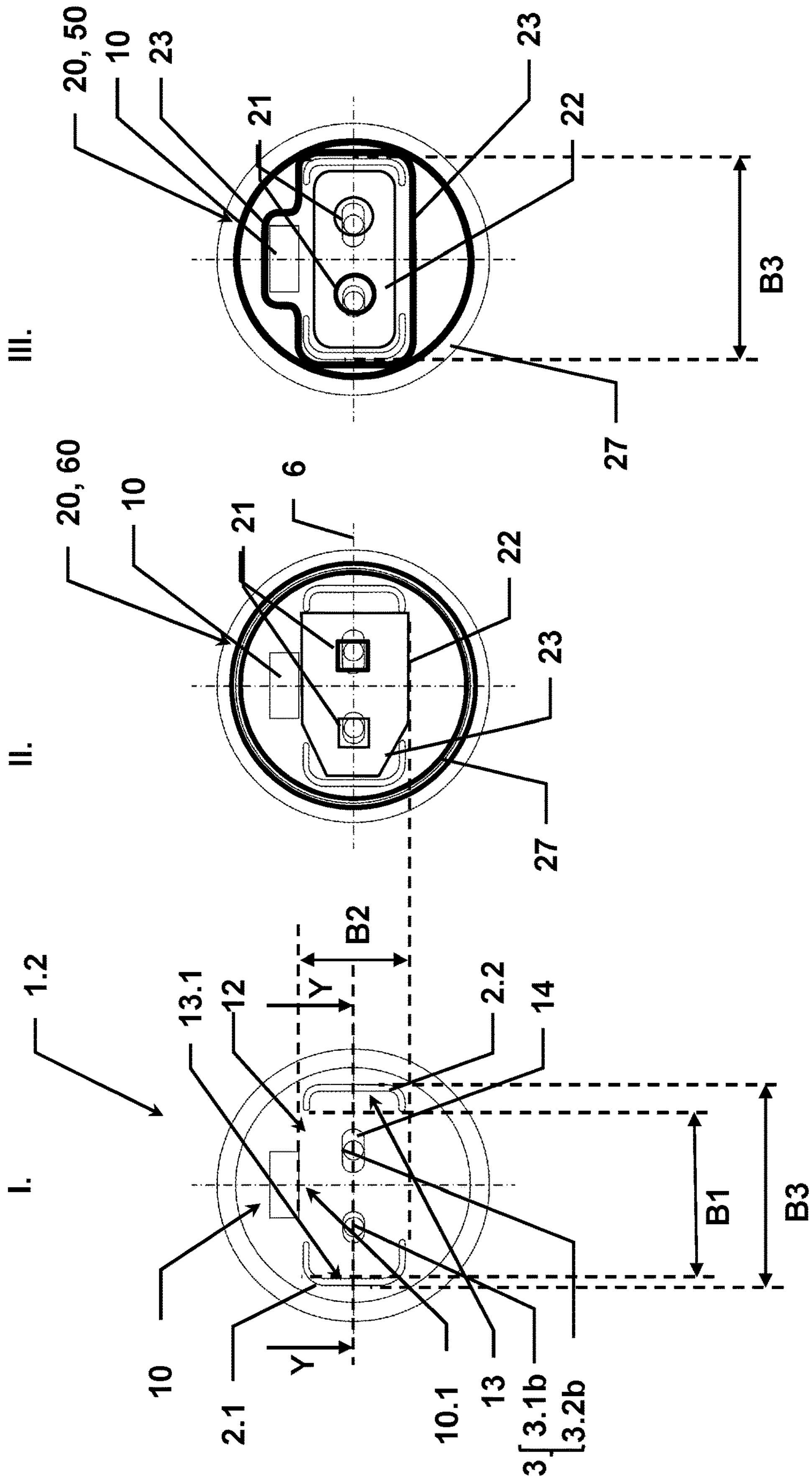
Figure 10:
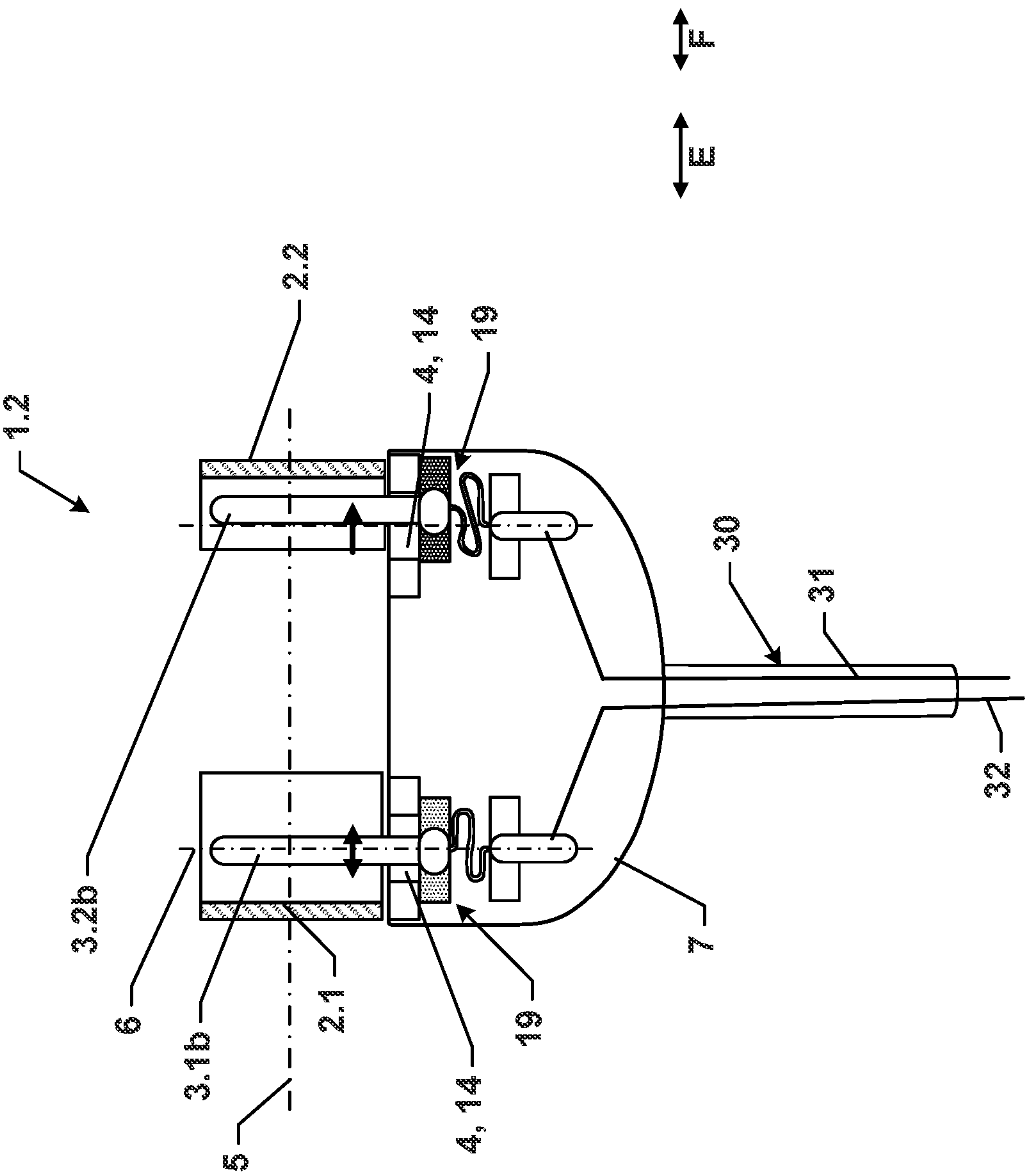

Finally, FIGS. 9 and 10 show the second group of embodiment examples, in which the connection plug 1.2 according to the disclosed embodiments is described in more detail. The connection plug 1.2 according to the disclosed embodiments, the guide element 2 of which is formed of two c- or u-shaped guide element portions 2.1, 2.2, is shown in partial view I. in the top views of FIG. 9. An alignment element 10 is arranged along the upper longitudinal side 12 for the position alignment. The (outer) transverse width or the (inner) transverse width, as the outer transverse width minus the wall thickness of the guide element portions 2.1, 2.2, correlates with the specifications of DIN EN IEC 63171-6, as can be seen in particular in partial view III. The inner and outer transverse width (not labelled) and the longitudinal width B3 of the c- or u-shaped guide element portions 2.1, 2.2 correlate with the specifications of standard DIN EN IEC 63171-6, as represented in particular in partial view III., as the mating socket element 50 is formed in accordance with standard DIN EN IEC 63171-6.

The dimension of the transverse width B2, which correlates with the specifications in accordance with standard DIN EN IEC 63171-5, is double the length from the straight connecting line 6 (center) to the inner surface of the alignment element 10. The longitudinal width B1, which, as dimension, also correlates with the specifications in accordance with standard DIN EN IEC 63171-5, extends from the (left-hand) inner surface of the first guide frame portion 2.1 to the perpendicular outer edges of the second guide frame portion 2.2.

The contact elements 3 formed as contact pins 3.1*b*, 3.2*b* are guided in each case in an elongated hole 14 at the top, wherein further details on the guiding of the displaceable contact pins 3.1*b*, 3.2*b* are represented in FIG. 10. Partial views II. and III. in each case show the connection plug 1.2 with a standard mating plug connector 50, 60, wherein partial view II. shows the connection to a mating plug connector 60 according to standard DIN EN IEC 63171-5 and partial view III. shows the connection to a mating plug connector 50 according to standard DIN EN IEC 63171-6. The mating plug connector 60 in partial view II. is position-coded in that the transverse side thereof, represented on the right, is brought into contact with the edges of the right-hand guide element portion 2.2 and, with its obliquely running surfaces, with the edges of the left-hand guide element portion 2.1, or it is guided by them during the plugging in. The longitudinal sides of the mating plug connector 60 protrude beyond the footprint which is spanned by the two guide element portions 2.1, 2.2. In other words, the mating plug connector 60 protrudes into the open portions the guide element portions 2.1, 2.2 in the direction transverse to the straight connecting line 5.

The alignment is furthermore brought about because the legs of the guide element portions 2.1 and 2.2 have a different side extent in the direction of the longitudinal side 12. For this, the transverse side of the mating plug connector 60 facing away from the mating alignment portions 23 is in contact with the guide element portion 2.2 with a short or shorter side extent. The larger side extent of the guide element portion 2.1 on the side facing the mating alignment portions 23 approach them until they are in contact or slightly spaced apart. The displaceable contact pins 3.1*b*, 3.2*b* of the connection plug 1.2 are captured by the standard mating contact elements/sockets 21 with a funnel-like opening and displaced in the direction of the contact element axis 6 and centered in the mating contact elements 21. The funnel-like opening can also be formed by the insulating material encircling the actual mating contact elements 21 here.

The connection to the mating plug connector 50 in accordance with standard DIN EN IEC 63171-6 is shown in partial view III. of FIG. 9. This has an inner mating guide element 22 and an outer alignment element 23, formed circumferentially as a frame, which has a shaft- or channel-like structure, which correlates with the alignment element 10 of the connection plug 1.2, on a longitudinal side. The mating guide element 22 is surrounded on the outside by the two guide element portions 2.1, 2.2 and fills the space as much as possible, wherein, analogously to partial view II., the displaceably mounted contact pins 3.1*b*, 3.2*b* are captured, displaced and centered by the round mating contact elements 21 widened in a funnel-shaped manner.

The outer alignment element 23 formed as a circumferential frame is completely in contact with the outer surface of the two guide element portions 2.1, 2.2 and widens in the area of the alignment element 10, with the result that the frame portion there is in contact with the alignment element 10 on the outside or is guided along behind it.

In the illustration of FIG. 10, the connection plug 1.2 according to the disclosed embodiments and already described in connection with FIG. 9 is shown as a vertical sectional representation. The different side extent in the case of the two guide element portions 2.1 and 2.2 can be clearly seen. The linear guide 19 of the contact pins 3.1*b*, 3.2*b*, which are guided in the respective elongated hole 14 and a linear bearing 19 arranged below it, can be seen in particular. The contact sections 4 are defined either by the maximum width of the elongated holes 14 or the maximum width of the linear bearing 19, depending on which are formed shorter. In each case one wire 31, 32 is connected to a non-displaceable contact pin, which in turn is connected in each case to the lower end of a displaceable contact pin 3.1*b*, 3.2*b* via a flexible line portion.

In an embodiment that is not represented, the respective wires 31, 32 of the supply line 30 are connected directly to the lower end of the respective contact pins 3.1*b*, 3.2*b*. In the embodiment example shown, the left-hand contact pin 3.1*b* in the central position is aligned with the contact element axis 6, thus not displaced. The right-hand contact pin 3.2*b* is displaced towards the right, in the direction of the transverse side of the guide element portion 2.2. Advantageously, elastic bodies, spring elements or comparable means for returning the contact pins 3.1*b*, 3.2*b* into the starting position can be provided, which is not represented in the present case.

Figure 11:
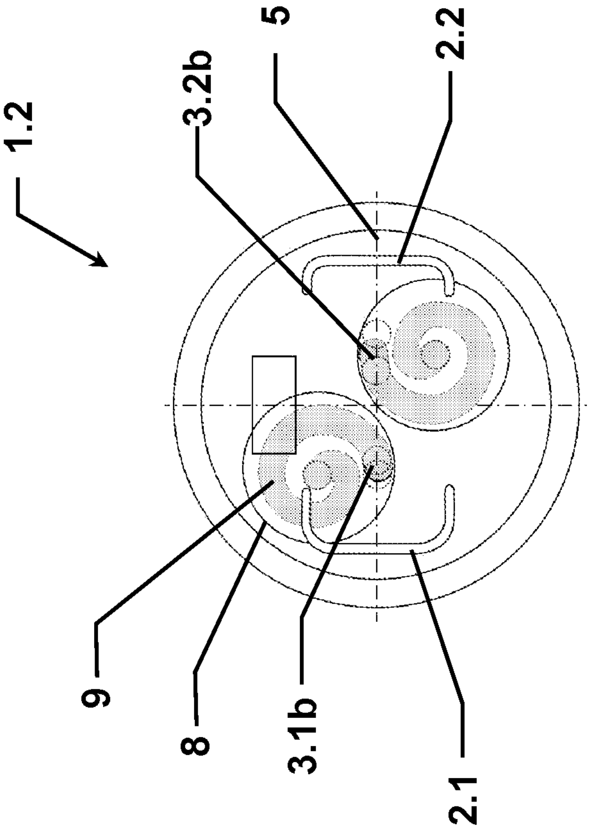

In a further embodiment, the displacement of a contact pin 3.1*b*, 3.2*b* is achieved by rotation within a cylinder 8, on the circumference of which the contact pins 3.1*b*, 3.2*b* are guided or fastened, as represented in FIG. 11. The circumference and position of the cylinders 8 are chosen such that the displacement on the permitted section of the straight connecting line 5, which intersects the two cylinders 8, is substantially the same as a linear displacement; the orthogonal proportions of the displacement are thus very small. The flexibility is advantageously achieved by a mounted spiral 9 or a spiral-shaped arrangement of a power- and data-carrying material.

The embodiments shown are shown for an M8 casing, which is not to be provided in a limiting sense, however, since these embodiments can be provided independently of a casing or in an M12 casing or a larger casing. The smallest size and/or proximity to a neighboring plug or connection element 1 according to the disclosed embodiments is substantially defined by the external dimensions of the respective mating connection element 20 including the desired dimension of the mating casing 27.

Overall, "contact" or "touching" between surfaces or parts of the connection elements on the one hand and the respective mating connection elements or surfaces and parts thereof is mentioned multiple times in the present case. This is not meant by way of limitation here as this is also meant to comprise being opposite completely or in portions because complementary elements of a plug and socket connection generally do not touch permanently and/or completely.

LIST OF REFERENCE NUMBERS

- 1 connection element
  - 1.1 connection socket
  - 1.2 connection plug
- 2 guide element
  - 2.1, 2.2 guide element portion
- 3 contact element (also 3.1, 3.2)
  - 3.1*a*, 3.2*a* contact socket
  - 3.1*b*, 3.2*b* contact pin
- 4 contact section
- 5 straight connecting line
- 6 contact element axis
- 7 casing
- 8 cylinder
- 9 spiral
- 10 alignment element (inner)
  - 10.1 contact surface, inner
  - 10.2 contact surface, outer
- 11 alignment element, second (outside)
  - 11.1 contact surface, inner
  - 11.2 contact surface, outer
  - 11.3 alignment portion
- 12 longitudinal side
- 13 transverse side, also 13.1
- 14 elongated hole
- 15 guide path (inner)
- 16 alignment portion
- 17 central web
- 18 guide path (outer)
- 19 linear bearing
- 20 mating connection element
- 21 mating contact elements
- 22 mating guide element
- 23 mating alignment element/portion
- 27 mating casing
- 28 component part, electronic . . .
- 29 component part casing
- 30 supply line
- 31 wire
- 32 wire

50 mating connection element according to ICE-6, first standard (also mating plug connector, mating socket connector)

60 mating connection element according to ICE-5, second standard (also mating plug connector, mating socket connector)

A distance

B1, B1+ transverse width

B2, B2+ longitudinal width

C opening width

D1 external diameter

D2 internal diameter

E width, inner

F width, inner

What is claimed is:

1. A connection element for a power and/or data carrying transmission technology, the connection element comprising:

a guide element; and first and second contact elements spaced apart from one another and having respective first and second contact element axes, wherein:

the guide element at least partially surrounds the first and second contact elements and is configured to guide and receive a mating connection element, the first and second contact elements have respective first and second contact sections configured for connection to a mating contact element of the mating connection element, the first and second contact sections lie on a straight connecting line which runs orthogonally through the first and second contact element axes, and the first and second contact elements are formed as first and second contact sockets with different slot widths along a direction of the straight connecting line or first and second contact pins with different travel lengths along a direction of the straight connecting line.

2. The connection element according to claim 1, wherein:

at least one of the first or second contact pins, when the first and second contact elements are formed as first and second contact pins, is mounted to be displaceable along the direction of the straight connecting line.

3. The connection element according to claim 1, wherein the guide element is characterized by:

a transverse width which is defined by a first standard; and a longitudinal width, transverse to the transverse width, which is defined by a second standard different from the first standard.

4. The connection element according to claim 1, wherein an alignment element is arranged on an outside surface of or outside of the guide element.

5. The connection element according to claim 1, wherein the connection element is a connection socket.

6. The connection element according to claim 5, further comprising an inner alignment element or an outer alignment element, wherein:

the inner alignment element is configured to form, with a longitudinal side of the guide element, a guide path for a frame portion of a mating connection element having a first mating plug configuration and the outer alignment element has an inner contact surface configured to act as a supporting and guiding surface for a mating connection element having a second mating plug configuration.

7. The connection element according to claim 1, wherein the connection element is a connection plug and the first and second contact elements are the first and second contact pins.

8. The connection element according to claim 7, wherein the guide element is formed to be not completely circumferential.

9. The connection element according to claim 7, wherein at least one contact pin of the first and second contact pins is displaceably mounted in such a way that it can be displaced relative to the other contact pin of the first and second contact pins so as to alter a spacing between the contact pins.

10. A kit of parts for forming a data or power carrying connection, the kit comprising:

a connection socket; and a connection plug, wherein at least one of the connection socket or the connection plug comprises:

a guide element; and first and second contact elements spaced apart from one another and having respective first and second contact element axes, wherein:

the guide element at least partially surrounds the first and second contact elements and is configured to guide and receive a mating connection element, the first and second contact elements have respective first and second contact sections configured for connection to a mating contact element of the mating connection element, the first and second contact sections lie on a straight connecting line which runs orthogonally through the first and second contact element axes, and the first and second contact elements are formed as first and second contact sockets with different slot widths along a direction of the straight connecting line or first and second contact pins with different travel lengths along a direction of the straight connecting line.

11. The kit of claim 10, wherein:

the connection socket comprises the guide element and the first and second contact elements; and the connection plug is formed as a mating connection plug in accordance with a standard.

12. The kit of claim 11, wherein the standard comprises the DIN EN IEC 63171-5 standard or the DIN EN IEC 63171-6 standard.

13. The kit of claim 10, wherein:

the connection plug comprises the guide element and the first and second contact elements; and the connection socket is formed as a mating connection socket in accordance with a standard.

14. The kit of claim 13, wherein the standard comprises the DIN EN IEC 63171-5 standard or the DIN EN IEC 63171-6 standard.

15. The kit of claim 10, wherein:

the connection socket comprises the guide element and the first and second contact elements;

the first and second contact elements comprise contact sockets;

the connection plug comprises a mating guide element and first and second mating contact elements; and the first and second mating contact elements comprise contact pins.

16. The kit of claim 11, wherein:

the first and second contact elements comprise the first and second contact sockets.

17. The kit of claim 13, wherein:

the first and second contact elements comprise the first and second contact pins; and at least one of the first or second contact pins is mounted to be displaceable along the direction of the straight connecting line.

18. An electronic component part for data- and power-carrying two-wire technology, the component part comprising:

a component part casing;

an electronic component; and a connection element, the connection element comprising:

a guide element; and first and second contact elements spaced apart from one another and having respective first and second contact element axes, wherein:

the guide element at least partially surrounds the first and second contact elements and is configured to guide and receive a mating connection element, the first and second contact elements have respective first and second contact sections configured for connection to a mating contact element of the mating connection element, the first and second contact sections lie on a straight connecting line which runs orthogonally through the first and second contact element axes, and the first and second contact elements are formed as first and second contact sockets with different slot widths along a direction of the straight connecting line or first and second contact pins with different travel lengths along a direction of the straight connecting line.

19. The electronic component part of claim 18, wherein:

the connection element comprises a connection socket; and the first and second contact elements comprise the first and second contact sockets.

20. The electronic component part of claim 18, wherein:

the connection element comprises a connection plug;

the first and second contact elements comprise the first and second contact pins; and at least one of the first or second contact pins is mounted to be displaceable along the direction of the straight connecting line.

* * * * *